(12) United States Patent
Kitaura et al.

(10) Patent No.: US 6,432,502 B1
(45) Date of Patent: Aug. 13, 2002

(54) OPTICAL RECORDING MEDIUM AND METHOD OF MANUFACTURING THE SAME

(75) Inventors: Hideki Kitaura, Kyoto; Rie Kojima; Noboru Yamada, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 2 days.

(21) Appl. No.: 09/711,622

(22) Filed: Nov. 13, 2000

(30) Foreign Application Priority Data

Nov. 17, 1999 (JP) .......................... 11-326537
Jan. 17, 2000 (JP) ........................ 2000-007404

(51) Int. Cl.$^7$ ............................... B32B 3/02
(52) U.S. Cl. ................ 428/64.1; 428/64.5; 430/270.13
(58) Field of Search ................ 428/64.1, 64.4, 428/64.5, 64.6, 913; 430/270.13, 495.1, 945; 369/283, 288

(56) References Cited

U.S. PATENT DOCUMENTS 6,115,352 A * 9/2000 Ohnoi ..................... 369/257.4

FOREIGN PATENT DOCUMENTS

| EP | 0 980 068 A1 | 2/2000 |
|----|----|----|
| JP | 5-342629 A | 12/1993 |
| JP | 9-161316 A | 6/1997 |
| JP | 11-073692 A | 3/1999 |
| WO | WO 98/47142 | 10/1998 |

\* cited by examiner

*Primary Examiner*—Elizabeth Mulvaney
(74) *Attorney, Agent, or Firm*—Merchant & Gould P.C.

(57) ABSTRACT

An optical recording medium having stable recording and reproducing characteristics even after a long term storage and a method of manufacturing the same are provided. The optical recording medium includes a substrate and a recording layer positioned above the substrate. The recording layer includes a phase change layer changing in phase reversibly between a crystalline state and an amorphous state by an irradiation of an optical beam, and a crystalline nucleation layer positioned adjacent to the phase change layer for facilitating crystallization of the phase change layer. The phase change layer is in the amorphous state, and the crystalline nucleation layer contains Te in a range between 33 atom % and 67 atom %.

9 Claims, 4 Drawing Sheets

OPTICAL RECORDING MEDIUM AND METHOD OF MANUFACTURING THE SAME

BACKGROUND OF THE INVENTION

1. Field of the Invention

The present invention relates generally to an optical recording medium, on or from which information signals can be recorded or reproduced by an irradiation of beams, and to a method of manufacturing the same.

2. Related Background Art

Conventionally, it has been known that a thin film formed of a chalcogen material can be changed in phase between an amorphous phase and a crystal phase by being irradiated with laser beams. Utilizing this phenomenon, phase-change type optical recording media have been developed.

In such phase-change type optical recording media, it is required to facilitate the phase change of a phase change layer (a recording layer). Therefore, conventional optical recording media include a phase change layer and a layer laminated on the phase change layer and made of a material promoting crystallization of the phase change layer (see JP 5-342629 A, JP 9-161316 A, JP 11-73692 A, and WO 98/47142 A).

However, conventional optical recording media had the following problems. In a conventional optical recording medium, either mark portions or space portions are amorphous and usually the mark portions are amorphous. In general, the amorphous state includes some metastable energy states. When the amorphous material is stored for a long period or at a high temperature, an energy state of the amorphous material after storage may vary from the one before storage in some cases. Therefore, optimum recording and reproducing conditions differ between before and after the storage. Consequently, even if recording and reproduction are carried out under the same conditions, recording and reproducing characteristics may vary between before and after the storage. For instance, when the amorphous portions in a recording layer have been changed into a more stable energy state, the crystallization of the recording layer tends to be difficult. As a result, the erase ratio in overwriting of information signals decreases in some cases.

SUMMARY OF THE INVENTION

Therefore, with the foregoing in mind, it is an object of the present invention to provide an optical recording medium having stable recording and reproducing characteristics even after a long term storage and to provide a method of manufacturing the same.

In order to achieve the above-mentioned object, an optical recording medium of the present invention includes a substrate and a recording layer positioned above the substrate, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer. The phase change layer is obtained by being deposited in an amorphous state and then crystallized, and the crystalline nucleation layer contains Te in a range between 33 atom % and 67 atom %. According to the above-mentioned optical recording medium, an optical recording medium having stable recording and reproducing characteristics even after a long term storage can be obtained. This optical recording medium is based on a new finding obtained through experiments conducted by the present inventors, i.e. a new finding that stable recording and reproducing characteristics after a long term storage can be obtained by the use of a crystalline nucleation layer containing Te in a range between 33 atom % and 67 atom %. In this connection, the term "layer" used in the present specification includes a layer formed in an insular form.

In the optical recording medium, the crystalline nucleation layer may include at least one selected from a group consisting of Sn—Te and Pb—Te. According to the above-mentioned configuration, an optical recording medium with particularly stable recording and reproducing characteristics even after long term storage can be obtained. This optical recording medium is based on a new finding obtained through experiments conducted by the present inventors, i.e. a new finding that the recording and reproducing characteristics after a long term storage are stabilized particularly through the use of the crystalline nucleation layer containing at least one selected from the group consisting of Sn—Te and Pb—Te. In this connection, the above-mentioned "Sn—Te" has no limitation in the ratio between Sn and Te and may have any composition ratios within the above-mentioned range of Te content. Similarly, the above-mentioned "Pb—Te" also may have any composition ratios within the above-mentioned range of Te content.

In the optical recording medium, the phase change layer may contain Ge, Sb, and Te as constituent elements, and the atomic ratio among Ge, Sb, and Te in the phase change layer may be expressed as Ge:Sb:Te=X:Y:Z, where $X+Y+Z=100$, $10 \leq X \leq 45$, $5 \leq Y \leq 40$, and $40 \leq Z \leq 60$. The aforementioned configuration enables an optical recording medium with a particularly high C/N ratio and erase ratio to be obtained.

The optical recording medium further may include first and second information layers positioned on or above the substrate and a separating layer positioned between the first and second information layers. At least one layer selected from a group consisting of the first and second information layers may include the recording layer. According to the above-mentioned configuration, an optical recording medium with a high recording density can be obtained.

In the optical recording medium, the crystalline nucleation layer may include at least one element selected from the group consisting of oxygen and nitrogen.

In the optical recording medium, the crystalline nucleation layer may have an extinction coefficient in a range between 0.5 and 2.0. According to the above-mentioned configuration, an optical recording medium with well balanced characteristics can be obtained.

In the optical recording medium, the phase change layer may have an average thickness between 4 nm and 14 nm. When the average thickness is set to be at least 4 nm, a tendency for the phase change layer not to be crystallized easily can be prevented. In addition, when the average thickness is set to be 14 nm or less, a high erase ratio can be obtained stably even after a long term storage.

Furthermore, in order to achieve the above-mentioned object, a method of manufacturing an optical recording medium according to the present invention is directed to a method of manufacturing an optical recording medium provided with a recording layer including a phase change layer and a crystalline nucleation layer positioned adjacent to the phase change layer. The method includes (a) depositing the phase change layer to be in an amorphous state, (b) forming the crystalline nucleation layer before or after the process (a), and crystallizing the phase change layer by an irradiation of an optical beam on the phase change layer in the amorphous state after the processes (a) and (b). The phase change layer changes in phase reversibly between a crystalline state and an amorphous state by an irradiation of an optical beam. The crystalline nucleation layer is a layer for facilitating the crystallization of the phase change layer and contains Te in a range between 33 atom % and 67 atom %. According to the above-mentioned manufacturing method, an optical recording medium having stable recording and reproducing characteristics even after a long term storage can be manufactured.

In the above-mentioned manufacturing method, the crystalline nucleation layer may contain at least one selected from a group consisting of Sn—Te and Pb—Te.

In the above-mentioned manufacturing method, the phase change layer may contain Ge, Sb, and Te as constituent elements and the atomic ratio among Ge, Sb, and Te in the phase change layer may be expressed as Ge:Sb:Te=X:Y:Z, where X+Y+Z=100, $10 \leq X \leq 45$, $5 \leq Y \leq 40$, and $40 \leq Z \leq 60$.

In the manufacturing method, the process (b) may include forming the crystalline nucleation layer in an atmosphere containing at least one element selected from a group consisting of oxygen and nitrogen, and the process (c) may include allowing the element selected from the group consisting of oxygen and nitrogen to leave from the crystalline nucleation layer. The above-mentioned configuration allows the crystalline nucleation layer to be formed easily in an amorphous state, thus facilitating the formation of the phase change layer in an amorphous state.

DETAILED DESCRIPTION OF THE INVENTION

Embodiments of the present invention are described with reference to the drawings as follows.

Embodiment 1

Figure 1:
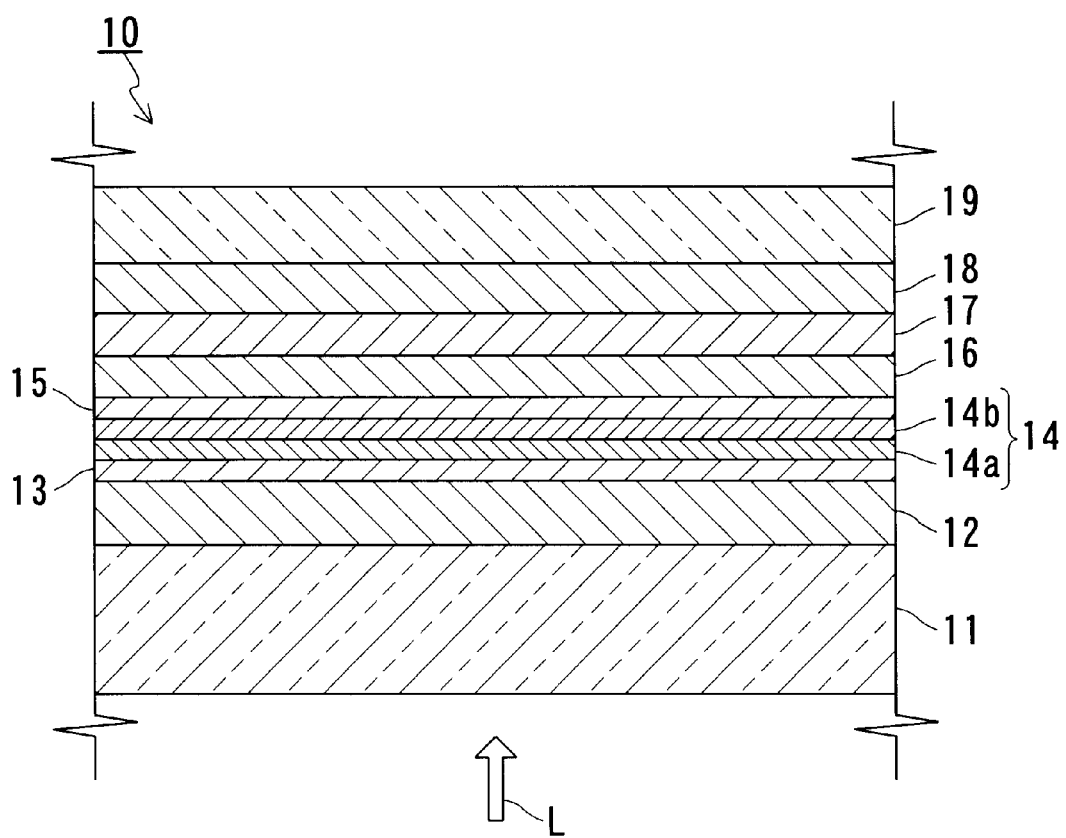
FIG. 1 is a partial sectional view showing an example of an optical recording medium according to the present invention.

In Embodiment 1, the description is directed to an example of an optical recording medium according to the present invention. FIG. 1 shows a partial sectional view of an example of an optical recording medium 10 according to Embodiment 1.

Referring to FIG. 1, the optical recording medium 10 includes a substrate 11, and a lower protective layer 12, a lower interface layer 13, a recording layer 14, an upper interface layer 15, an upper protective layer 16, an optical absorption correction layer 17, a reflective layer 18, and an overcoat layer 19, which are laminated sequentially on the substrate 11. The optical recording medium 10 is irradiated with a laser beam L from the direction indicated by an arrow shown in FIG. 1 and thus information signals are recorded on or reproduced from the optical recording medium 10.

The substrate 11 is a disc-shaped transparent substrate. Materials used for the substrate 11 include, for example, a polycarbonate resin, a polymethyl methacrylate resin, a polyolefin resin, a norbornene type resin, an ultraviolet curable resin, or glass. The thickness of the substrate 11 is not particularly limited, but is, for example, in a range between about 0.05 mm and 2.0 mm. At the surface of the substrate 11 on the recording layer 14 side, spiral or concentric circular grooves may be formed for tracking control.

The recording layer 14 includes a crystalline nucleation layer 14a and a phase change layer 14b, which are laminated sequentially from the substrate side.

The phase change layer 14b changes in phase reversibly between a crystal phase and an amorphous phase by an irradiation of a laser beam. The phase change layer 14b can be formed using a material whose optical constants (a refractive index n and an extinction coefficient k) vary by an irradiation of a laser beam. For instance, Te-based or Se-based chalcogenide can be used as the material for the phase change layer 14b. Examples of such chalcogenide include alloys containing, as a main component, Ge—Sb—Te, Ge—Te, Pd—Ge—Sb—Te, Ag—Ge—Sb—Te, In—Sb—Te, Sb—Te, Ag—In—Sb—Te, Au—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co, or the like. In addition, alloys obtained by an addition of nitrogen, oxygen, or the like to the above-mentioned alloys also may be used. Particularly, it is preferable that the phase change layer 14b contains Ge, Sb, and Te as constituent elements, and Ge—Sb—Te is preferred. In this case, it is particularly preferable that the atomic ratio among Ge, Sb, and Te in the phase change layer 14b may be expressed as Ge:Sb:Te=X:Y:Z, where X+Y+Z=100, $10 \leq X \leq 45$, $5 \leq Y \leq 40$, and $40 \leq Z \leq 60$.

In the optical recording medium 10 according to Embodiment 1, the phase change layer 14b is in a crystalline state, as an initial state before information signals are recorded. The phase change layer 14b is deposited to be in an amorphous state. In other words, the phase change layer 14b directly after the deposition (so-called "as-depo") is in an amorphous state and is crystallized by an initialization process (irradiation of an optical beam) after the deposition.

Preferably, the phase change layer 14b has an average thickness between 4 nm and 14 nm. An excessively thin phase change layer 14b may result in an excessively high cooling rate after being heated by the irradiation of a laser beam, thus causing difficulty in crystallization of the phase change layer 14b in some cases. However, when the average thickness of the crystalline nucleation layer 14a is set to be at least 4 nm, such a problem can be avoided. In addition, when the phase change layer 14b is excessively thick, the effect of the crystalline nucleation layer 14a may not be exerted on the whole phase change layer 14b in some cases. However, when the average thickness of the crystalline nucleation layer 14a is set to be 14 nm or less, such a problem can be avoided.

The crystalline nucleation layer 14a serves as a layer for facilitating the change of the phase change layer 14b from the amorphous phase to the crystal phase by forming crystalline nuclei. In other words, the crystalline nucleation layer 14a serves as a layer for promoting the crystallization of the phase change layer 14b when the phase change layer 14b in an amorphous state is irradiated with a laser beam to be crystallized for writing or erasing information signals.

The crystalline nucleation layer 14a contains Te in a range between 33 atom % and 67 atom %. Specifically, Sn—Te and Pb—Te, which are stable NaCl-type crystals, or materials containing them can be used as the materials of the crystalline nucleation layer 14a.

In the case where the crystalline nucleation layer 14a is made of Sn—Te or Pb—Te, the effect of the crystalline nucleation is maintained even when the content of Te deviates slightly from a stoichiometric composition ratio of 50 atom %. However, when the content of Te deviates considerably from the stoichiometric composition ratio, the crystal structure changes and as a result, a desired effect cannot be obtained. Thus, Te in the crystalline nucleation layer 14a is required to be contained in a range between 33 atom % and 67 atom %, particularly preferably between 40 atom % and 60 atom %.

Preferably, the extinction coefficient of the crystalline nucleation layer 14a is in a range between 0.5 and 2.0.

In the recording layer 14 including the crystalline nucleation layer 14a, the phase change layer 14b tends to be crystallized excessively easily, and therefore, there is a possibility that a mark size may be reduced to cause a decrease in signal amplitude. In addition, when the crystalline nucleation layer 14a is formed on the substrate 11 side with respect to the phase change layer 14b, i.e. when the crystalline nucleation layer 14a is formed as an underlayer of the phase change layer 14b, the phase change layer 14b may be crystallized partially or as a whole during deposition in some cases. This causes excessively large or uneven sizes of crystal grains in the phase change layer 14b. As a result, a difference in the sizes of crystal grains occurs between before and after recording, thus causing the possibility of the increase in noise at the beginning of the recording and accordingly, the decrease in the C/N ratio.

In order to prevent such decrease in the C/N ratio, preferably, the crystalline nucleation layer 14a contains an element allowed to leave at a lower temperature than a melting point of the phase change layer 14b. Specifically, it is preferable that the crystalline nucleation layer 14a contains at least one element selected from a group consisting of oxygen and nitrogen. When using such a material, the crystalline nucleation layer 14a is in an amorphous state directly after deposition and has no regular crystal structure. This can be confirmed easily by an observation of an X-ray diffraction pattern. This can suppress the excessively easy crystallization of the phase change layer 14b and thus prevent the decrease in the signal amplitude. Similarly, when the crystalline nucleation layer 14a is formed as an underlayer of the phase change layer 14b, the phase change layer 14b also can be prevented from being crystallized during deposition.

The phase change layer 14b in an amorphous state can be crystallized by annealing using a laser beam or the like. In that case, the grain size can be adjusted through the optimization of conditions under which the laser beam is irradiated. As a result, the noise caused by the difference in grain size can be reduced, thus preventing the decrease in the C/N ratio.

The lower protective layer 12 and the upper protective layer 16 are formed for suppressing the increase of noise due to thermal damages to the substrate 11 and the recording layer 14 by the irradiation of the laser beam L, and for adjusting reflectance, absorptance, and a phase of reflected light with respect to the laser beam L. Preferably, therefore, the lower protective layer 12 and the upper protective layer 16 are physically and chemically stable, have a higher melting point and softening temperature than the melting point of the recording layer 14, and are formed of a material with no solid solubility with respective to the material of the recording layer 14. For instance, oxides of Y, Ce, Ti, Zr, Nb, Ta, Co, Zn, Al, Si, Ge, Sn, Pb, Sb, Bi, Te, and the like can be used. Nitrides of Ti, Zr, Nb, Ta, Cr, Mo, W, B, Al, Ga, In, Si, Ge, Sn, Pb, and the like also can be used. Further, carbides of Ti, Zr, Nb, Ta, Cr, Mo, W, Si, and the like can be used. In addition, sulfides of Zn or Cd also can be used. Selenides or tellurides can be used. Fluorides of Mg, Ca, and the like also can be used. Moreover, C, Si, or Ge, or dielectrics formed of mixtures thereof also can be used.

The lower protective layer 12 and the upper protective layer 16 may be formed using different materials or the same material as required.

The lower interface layer 13 and the upper interface layer 15 are formed for preventing mutual diffusion of atoms between the lower protective layer 12 or the upper protective layer 16 and the recording layer 14 during recording and reproduction. Therefore, the lower interface layer 13 and the upper interface layer 15 are formed of materials allowing the above-mentioned object to be achieved. Preferable materials are those containing, as a main component, nitrides, oxides, and carbides of Ge, Si, Al, Cr, and the like, or those containing mixtures thereof as a main component.

Even when only one of the lower interface layer 13 and the upper interface layer 15 is provided, the above-mentioned effect is exhibited. However, it is preferred to provide both. When both the lower interface layer 13 and the upper interface layer 15 are provided, they may be formed using different materials or the same material as required.

The optical absorption correction layer 17 is formed for adjusting the ratio of the optical absorptance when the phase change layer 14b is in a crystalline state to that when the phase change layer 14b is in an amorphous state, to prevent a mark shape from being distorted in overwriting. In addition, the optical absorption correction layer 17 is formed for increasing the difference between the reflectance when the phase change layer 14b is in a crystalline state and that when the phase change layer 14b is in an amorphous state to increase the signal amplitude. Therefore, the optical absorption correction layer 17 is formed of a material that has a high refractive index and absorbs light adequately. Examples of the material to be used for the layer 17 include materials with a refractive index n between 3 and 6 and an extinction coefficient k between 1 and 4. Specifically, Ge alloys or Si alloys in an amorphous state can be used, including, for example, alloys such as Ge—Cr, Ge—Mo, Si—Cr, Si—Mo, Si—W or the like. In addition, crystalline metals, semimetals, or semiconductors also may be used, including, for example, Ti, Zr, Nb, Ta, Cr, Mo, W. Sn—Te, Pb—Te, or the like.

The reflective layer 18 is formed for utilizing an incident laser beam L efficiently and allowing the recording layer 14 to change into an amorphous state easily through the improvement in the cooling rate of the recording layer 14. Therefore, materials used for the reflective layer 18 include metallic materials with high thermal conductivity or materials obtained by an addition of other elements to the metallic materials for improving moisture resistance or adjusting the thermal conductivity. For example, Al, Au, Ag, or Cu, or alloys thereof can be used. Specifically, alloys such as Al—Cr, Al—Ti, Ag—Pd, Ag—Pd—Cu, Ag—Pd—Ti, or the like can be used. In this case, however, depending on the recording conditions such as a linear velocity, the composition of the recording layer, or the like, the recording layer 18 may change into an amorphous state easily enough without any assistance of the cooling effect of the reflective layer 18. In such a case, the reflective layer 18 may be omitted.

For the overcoat layer 19, materials with high thermostability and high adhesiveness can be used, including, for example, adhesive resins such as an ultraviolet curable resin. As the overcoat layer 19, a dummy substrate may be laminated on the reflective layer 18. The dummy substrate can be laminated using an adhesive resin, a double-sided tape, a dielectric film, or the like. Instead of the overcoat layer 19, another optical recording medium may be laminated to form an optical recording medium with a double-sided structure.

The above description is directed to the optical recording medium according to Embodiment 1, but the optical recording medium of the present invention is not limited to those with the above-mentioned configuration. For instance, the crystalline nucleation layer 14a may be formed between the phase change layer 14b and the upper interface layer 15 or may be formed on both sides of the phase change layer 14b (which also applies to the following embodiments). In addition, the configuration of the optical recording medium of the present invention is not particularly limited as long as the optical recording medium includes the above-mentioned recording layer (which also applies to the following embodiments). For example, layers such as the interface layers, the protective layers, the optical absorption layer, the reflective layer, and the overcoat layer may be added, changed, or omitted according to the performance required for the optical recording medium.

Emnbodiment 2

Figure 2A:
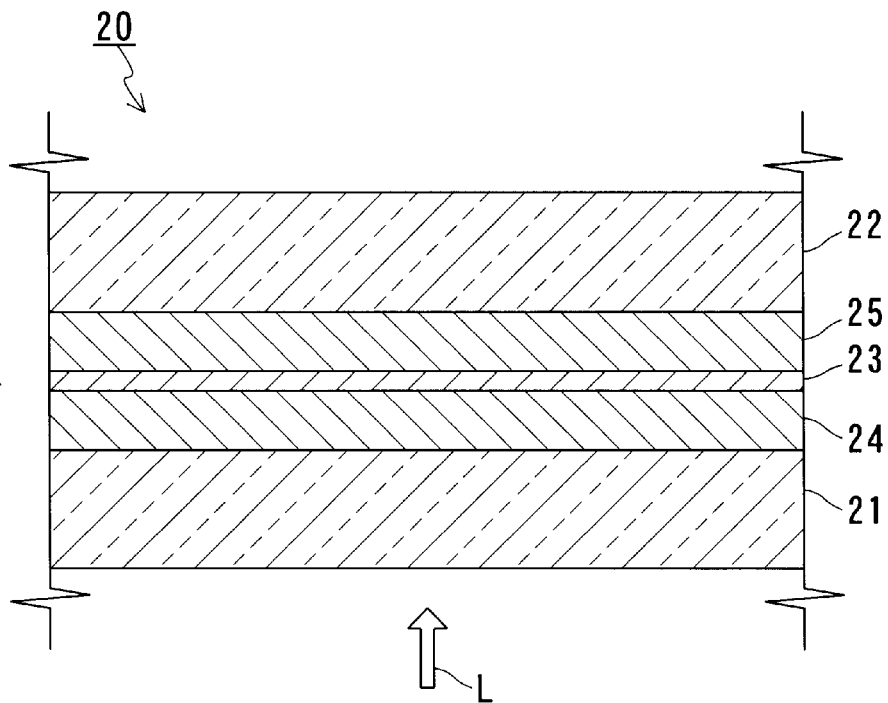
FIG. 2A is a partial sectional view showing another example of an optical recording medium according to the present invention.

In Embodiment 2, another example of an optical recording medium according to the present invention will be described. FIG. 2A shows a partial sectional view of an optical recording medium 20 according to Embodiment 2.

Figure 2B:
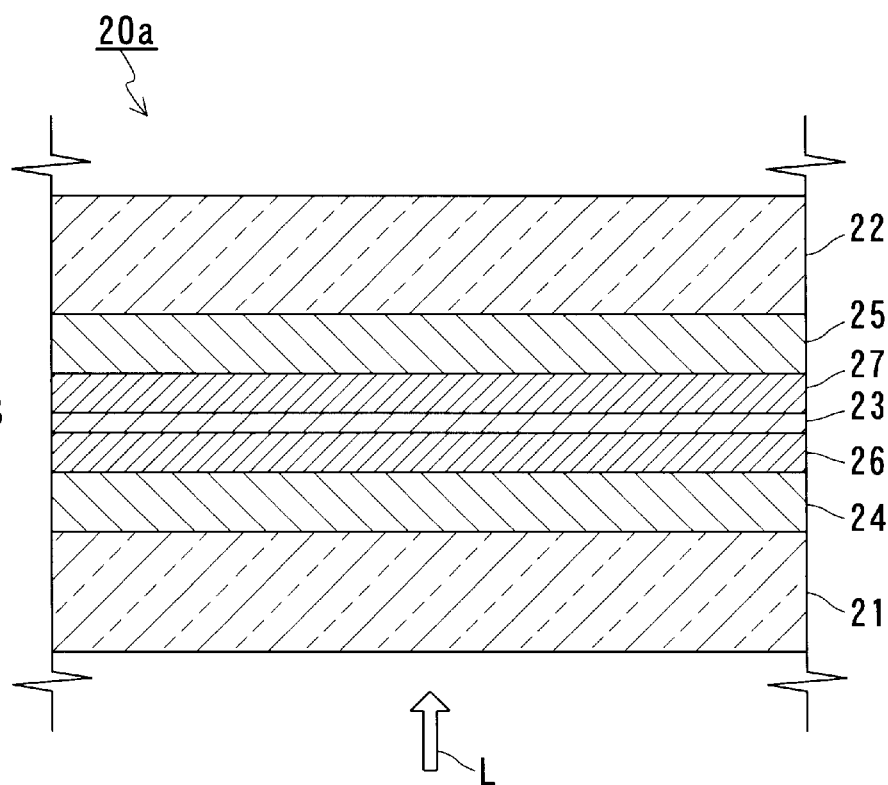
FIG. 2B is a partial sectional view showing still another example of an optical recording medium according to the present invention.

Referring to FIG. 2A, the optical recording medium 20 includes a first substrate 21, a second substrate 22 positioned to oppose the first substrate 21, a separating layer 23, a first information layer 24, and a second information layer 25. The separating layer 23 is positioned between the first substrate 21 and the second substrate 22. The first information layer 24 is disposed between the first substrate 21 and the separating layer 23. The second information layer 25 is placed between the second substrate 22 and the separating layer 23. In other words, the optical recording medium 20 include the first information layer 24 and the second information layer 25 that are formed on and above the first substrate 21 and the separating layer 23 positioned between the first information layer 24 and the second information layer 25. The optical recording medium 20 may include the protective layer, interface layer, and overcoat layer described in Embodiment 1. As an example, FIG. 2B shows a partial sectional view of an optical recording medium 20a including a first overcoat layer 26 and a second overcoat layer 27.

For the first substrate 21, the same substrate as the substrate 11 can be used.

Similarly, for the second substrate 22, the same substrate as the substrate 11 can be used. Furthermore, for the second substrate 22, a nontransparent substrate may be used, which is different from the case of the first substrate 21. The second substrate 22 may be different from the first substrate 21 in material, thickness, or the like. When grooves are to be formed at the surfaces of the first substrate 21 and the second substrate 22, the grooves on both the surfaces may be different in shape or spiral direction from each other. When guide grooves for the second information layer 25 are formed at the surface of the separating layer 23 on the second information layer 25 side by a photopolymer method, the second substrate 22 may not be required to have grooves at its surface on the second information layer 25 side.

The second substrate 22 may be laminated on the second information layer 25 using an adhesive or the like. The second substrate 22 may be formed through an application of a resin for an overcoat onto the second information layer 25 and then curing the resin.

At least one layer selected from a group consisting of the first information layer 24 and the second information layer 25 includes the recording layer 14 (the crystalline nucleation layer 14a and the phase change layer 14b) described in Embodiment 1 and is a rewritable layer.

When either the first information layer 24 or the second information layer 25 does not include the recording layer 14, the layer may be any one of a rewritable layer and a layer used exclusively for reproduction. The layer used exclusively for reproduction can be formed with a configuration generally employed in CD-ROM or the like. For instance, on a substrate with a concave and convex pattern formed corresponding to information signals, a layer may be formed using a material with a different refractive index from that of the substrate.

When the first information layer 24 is a rewritable information layer including the recording layer 14, the first information layer 24 is required to have a higher transmittance for carrying out recording and reproduction for the second information layer 25 with sufficient power. Preferably, therefore, the recording layer 14 in the first information layer 24 is thin. Generally, however, crystallization ability decreases with a reduction in thickness of the phase change layer 14b due to the increase in cooling rate of the phase change layer 14b. Therefore, a sufficient erasing performance may not be obtained. In the optical recording medium 20, however, the recording layer 14 includes the crystalline nucleation layer 14a, and therefore the crystallization ability is improved, thus obtaining a sufficient erasing performance even when the phase change layer 14b is thin.

When the second information layer 25 is a rewritable information layer including the recording layer 14, the second information layer 25 is required to have high reflectance so that a sufficient quantity of reflected light can be obtained. Furthermore, the second information layer 25 is required to have high recording sensitivity so that reliable recording can be carried out with a laser beam that has passed through the first information layer 24. For such purposes, it is necessary that the temperature of the phase change layer 14b increase efficiently even with a small quantity of absorbed light, and thus, it is preferable that the phase change layer 14b is thin. As described above, in the optical recording medium 20, the recording layer 14 includes the crystalline nucleation layer 14a, thus obtaining a sufficient erasing performance even when the phase change layer 14b is thin.

The separating layer 23 is formed for preventing crosstalk between the first information layer 24 and the second information layer 25. In the optical recording medium 20, recording or reproduction is carried out using a laser beam L with respect to the respective first information layer 24 and second information layer 25. Preferably, therefore, the separating layer 23 is formed of a material having a small absorption coefficient at a wavelength λ of the laser beam L, high thermostability, and high adhesiveness. Specifically, adhesive resin such as an ultraviolet curable resin, a double-sided tape, a dielectric film, or a suitable combination thereof can be used for the separating layer 23.

In the optical recording medium 20, when the recording or reproduction is carried out with respect to either one of the first information layer 24 or the second information layer 25, it is required to prevent information signals from being recorded on or reproduced from the other layer. Therefore, the separation layer 23 is required to have a thickness equal to or more than a focal depth. Specifically, it is preferable that the separation layer 23 has a thickness of at least 2 μm. In addition, preferably, the thickness of the separation layer 23 is 100 μm or less so that the laser beam L can be focused on both the first information layer 24 and the second information layer 25.

Embodiment 3

In Embodiment 3, an example of a method of manufacturing an optical recording medium according to the present invention will be described. The same portions as those described in the above-mentioned embodiments are indicated with the same numerals and the duplicate descriptions will be omitted.

Initially, a lower protective layer 12, a lower interface layer 13, a recording layer 14 (including a crystalline nucleation layer 14a and a phase change layer 14b), an upper interface layer 15, an upper protective layer 16, an optical absorption correction layer 17, and a reflective layer 18 are formed sequentially on the surface of a substrate 11, on which guide grooves have been formed. These layers can be formed by general vapor phase film deposition methods including, for example, a vacuum evaporation method, a sputtering method, an ion plating method, a CVD (Chemical Vapor Deposition) method, or a MBE (Molecular Beam Epitaxy) method. Among these methods, the sputtering method is preferable for the formation of the recording layer 14 when consideration is given to deposition rate, manufacturing cost, and qualities of the films to be formed.

As described in Embodiment 1, preferably the crystalline nucleation layer 14a contains Te in a range between 33 atom % and 67 atom % and is made of Sn—Te or Pb—Te.

The phase change layer 14b is deposited in an amorphous state. Under general deposition conditions, the phase change layer 14b is deposited in an amorphous state. Particularly, deposition under conditions of a high power and a high deposition rate ensures that the phase change layer 14b can be deposited in an amorphous state.

When the crystalline nucleation layer 14a is positioned on the substrate 11 side with respect to the phase change layer 14b, the crystalline nucleation layer 14a is formed before the formation of the phase change layer 14b. When the phase change layer 14b is positioned on the substrate 11 side with respect to the crystalline nucleation layer 14a, the crystalline nucleation layer 14a is formed after the formation of the phase change layer 14b.

When a crystalline nucleation layer 14a containing at least one element selected from a group consisting of oxygen and nitrogen is to be formed, the crystalline nucleation layer 14a may be formed in an atmosphere containing at least one element selected from the group consisting of oxygen and nitrogen. Specifically, the above-mentioned element may be introduced into a deposition device (a chamber). According to this, the characteristics and the bonded states between atoms in the crystalline nucleation layer 14a can be adjusted, which may be effective in improving cyclability and moisture resistance.

After the formation of the reflective layer 18, an overcoat layer 19 is formed. The overcoat layer 19 can be formed through an application of an ultraviolet curable resin onto the reflective layer 18 by spin coating and then an irradiation of ultraviolet rays for curing.

Next, the recording layer 14 is initialized. Specifically, the recording layer 14 is irradiated with an optical beam such as a laser beam, and thereby the phase change layer 14b in an amorphous state is crystallized. When the crystalline nucleation layer 14a contains nitrogen or oxygen, such an element is allowed to leave from the crystalline nucleation layer 14a during this initialization. This allows the function of the crystalline nucleation layer 14a, i.e. the function of crystalline nucleation to be exhibited sufficiently. Thus, the optical recording medium 10 can be manufactured. The initialization process may be carried out before the formation of the overcoat layer 19.

Similarly, the optical recording medium 20 described in Embodiment 2 also can be manufactured by the same method as that described above. The separating layer 23, the first information layer 24, and the second information layer 25 can be formed by the aforementioned vapor phase film deposition methods.

When the optical recording medium 20a described in Embodiment 2 is to be formed, initially the first information layer 24 and the first overcoat layer 26 are formed sequentially on the first substrate 21, and the second information layer 25 and the second overcoat layer 27 are formed sequentially on the substrate 22. Then, the first overcoat layer 26 and the second overcoat layer 27 may be bonded with the separating layer 23 being interposed therebetween. For example, an ultraviolet curable resin may be applied to both surfaces of the separating layer 23 and the two substrates may be laminated on the surfaces, respectively, which then may be irradiated with ultraviolet rays. In this case, the initialization process can be carried out before or after the adhesion of the two substrates. Thus, the optical recording medium 20a can be manufactured.

The above description was directed to a method of manufacturing an optical recording medium according to the present invention. However, the manufacturing method of the present invention further may include the following process for recording information signals as described below.

Figure 3:
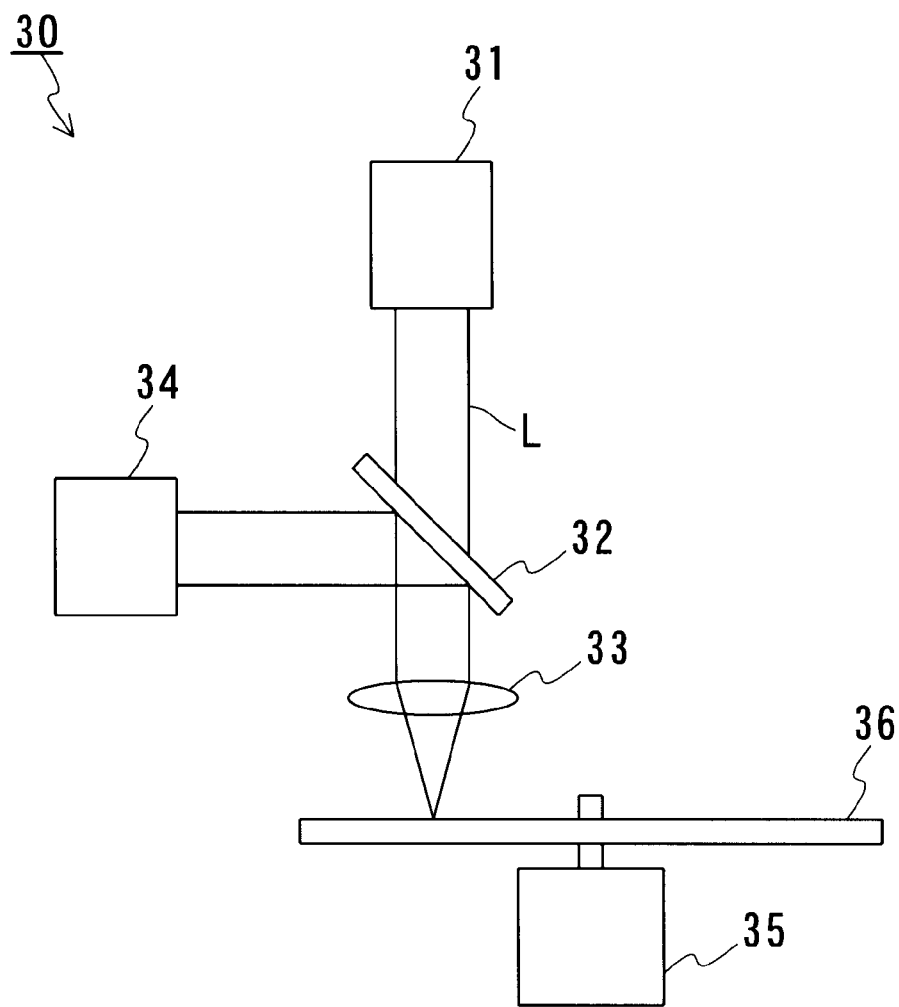
FIG. 3 is a schematic structural view illustrating an example of a recording/reproducing device employed in a recording and reproduction method using an optical recording medium according to the present invention.

The following description is directed to an example of a method of recording and reproducing information signals using an optical recording medium of the present invention. FIG. 3 shows an example of a device for recording and reproducing information signals with an optical recording medium.

The recording/reproducing device 30 shown in FIG. 3 includes a laser diode 31, a half mirror 32, an objective lens 33, a photodetector 34, and a motor 35. The motor 35 rotates an optical recording medium 36. The optical recording medium 36 is the one according to the present invention and is irradiated with a laser beam L from the substrate 11 side or the first substrate 21 side.

The laser beam L emitted from the laser diode 31 passes through the half mirror 32 and the objective lens 33 to be focused on the optical recording medium 36, thus recording and reproducing information signals.

Figure 4:
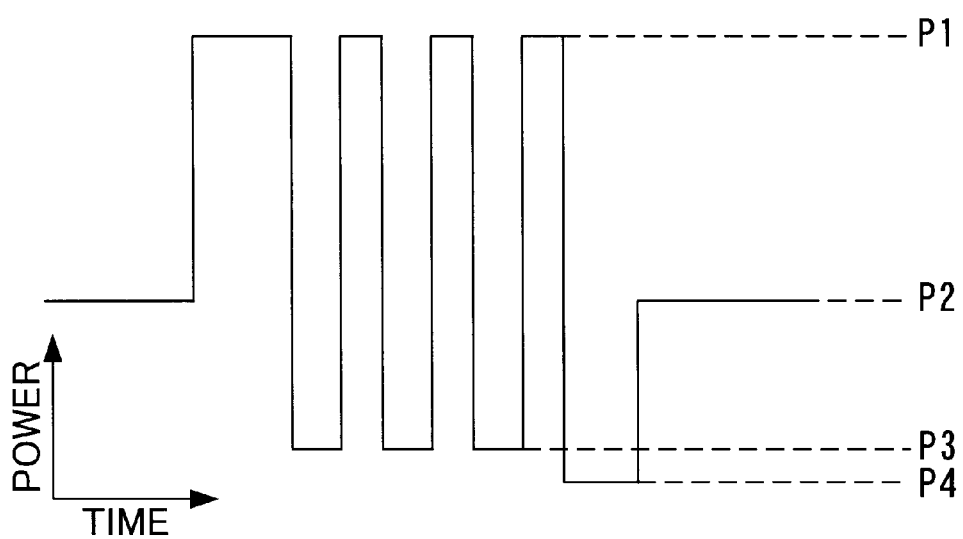
FIG. 4 is a schematic view showing an example of a pulse shape of an optical laser used in the recording and reproduction method using an optical recording medium according to the present invention.

When the information signals are to be recorded, the intensity of the laser beam L is modulated to have a pulse shape shown in FIG. 4. In other words, the intensity of the laser beam L is modulated among power levels P1, P2, and P3, where P1>P2≧P3≧0. The power level P1 is one sufficient for instantaneously melting the phase change layer 14b upon an irradiation of the laser beam L. The power levels P2 and P3 are those at which the phase change layer 14b cannot be melted instantaneously upon the irradiation of the laser beam L. The laser intensity can be modulated by modulation of a current for driving a semiconductor laser. In addition, the laser intensity may be modulated using means such as an electro-optical modulator, an acousto-optic modulator, or the like.

Marks of information signals are formed through the change of the phase change layer 14b from a crystalline state to an amorphous state. The marks can be formed by an irradiation of a single rectangular pulse at a power level P1 on the optical recording medium 36. For the formation of a longer mark, it is preferred to use a recording pulse train including a plurality of pulse trains modulated among the power levels P1, P2, and P3. The use of such a pulse train prevents overheating and allows the mark to have a uniform width. The portions where no mark is to be formed or portions with marks to be erased are irradiated with a laser beam L at a power level P2.

As shown in FIG. 4, a laser beam at a power level P4 (wherein P2>P4≧0) may be irradiated directly after the above-mentioned plurality of pulse trains. Such a cooling section can eliminate a heat of a mark end that tends to be particularly overheated, and is effective in adjusting a mark shape. The leading end of a mark tends not to change into an amorphous state easily and tends to be reduced in mark width. Therefore, at the leading end of a mark, only a leading pulse out of the plurality of pulse trains may be applied for a longer time or the power level of the leading pulse may be increased to be higher than P1 so as to obtain the same mark width both at the end and at the leading end. On the other hand, when the times of the respective pulses in the plurality of pulse trains and times between the respective pulses are set to be the same, the modulation can be carried out with a single frequency, which provides an advantage of simplifying a modulation method.

In the recording and reproduction with respect to an optical recording medium, mark edge positions are not aligned, and irregularity in mark edge may arise and cause an increase in jitter due to the influences of the length of a mark, the lengths of spaces before and after the mark, a length of an adjacent mark, or the like. In order to prevent such an increase in jitter, the positions and lengths of the respective pulses of the above-mentioned pulse trains may be adjusted to be corrected so that the edge positions are aligned in every pattern.

When the information signals thus recorded are to be reproduced, the optical disk is irradiated with continuous light at a power level P5 (wherein P2>P5>0), the light reflected from the optical disk is allowed to enter the photodetector 34, and the variations in quantity of the reflected light are detected as reproduced signals.

EXAMPLES

The present invention is described further in detail using examples as follows, but is not limited to the following examples.

Example 1

In Example 1, the description is directed to one example of manufacturing the optical recording medium 10 described in Embodiment 1.

In Example 1, a substrate (with a diameter of 12 cm and a thickness of 0.60 mm) made of a polycarbonate resin was used. At the surface of the substrate, a spiral groove was formed to have a depth of about 70 nm and a width of 0.6 µm with a land being formed to have a width of 0.6 µm.

Next, on the surface with the groove of the substrate, a lower protective layer (with a thickness of about 140 nm), a lower interference layer (with a thickness of about 5 nm), a crystalline nucleation layer, a phase change layer (with a thickness of about 9 nm), an upper interface layer (with a thickness of about 3 nm), an upper protective layer (with a thickness of about 40 nm), an optical absorption correction layer (with a thickness of about 40 nm), and a reflective layer (with a thickness of about 80 nm) were laminated sequentially. In this manner, a plurality of samples different in thickness and positions of the crystalline nucleation layer from one another were produced. The respective layers were formed by sputtering using a target with a thickness of about 6 mm and a diameter of 10 cm.

Specifically, the lower protective layer was formed using a target of $ZnS-SiO_2$ ($ZnS:SiO_2$=80:20 in mole ratio); the lower interface layer using a Ge target; the crystalline nucleation layer using a target of Sn—Te (Sn:Te=50:50 in atomic ratio); the phase change layer using a target of Ge—Sb—Te (Ge:Sb:Te=29:21:50 in atomic ratio); the upper interface layer using the Ge target; the upper protective layer using a target of $ZnS-SiO_2$ ($ZnS:SiO_2$=80:20 in mole ratio); the optical absorption correction layer using a target of Ge—Cr (Ge:Cr=80:20 in atomic ratio); and the reflective layer using a target of Ag—Pd—Cu (Ag:Pd:Cu= 98:1:1 in atomic ratio).

The phase change layer and the interface layers were formed using mixed gases of Ar and nitrogen as a sputtered gas. The amount of the nitrogen gas contained in the sputtered gas was set to be about 5 vol % for the formation of the phase change layer and about 40 vol % for the formation of the interface layers. For the formation of the layers other than those, only Ar was used as a sputtered gas. The crystalline nucleation layer was formed using a DC power supply under conditions of a sputtering power of 50W and a sputtered gas pressure of 0.3 Pa.

Onto the surface of multiple layers thus formed, an ultraviolet curable resin was applied by spin coating. Then, the ultraviolet curable resin was irradiated with ultraviolet rays to be cured, thus forming an overcoat layer. After that, the multiple layers were irradiated with a laser beam from the substrate side, and thereby the phase change layer was annealed, thus initializing, i.e. crystallizing the whole surface of the phase change layer.

Thus, ten types of optical recording media were produced to be different in thicknesses and positions of the crystalline nucleation layers. With respect to the optical recording media thus produced, mark edge recording with a linear velocity of 8.2 m/s was carried out using an optical system with a numerical aperture (NA) of 0.6 and a wavelength of 660 nm. Then, the following measurements were conducted. Initially, a 3T signal at 9.7 MHz and an 11T signal at 2.6 MHz were recorded for 11 times alternately in the groove and land. In other words, the 3T signal was recorded for 6 times and the 11T signal for 5 times. Then, this track was reproduced in the state where the 3T signals had been recorded, and the C/N ratio was measured using a spectrum analyzer. Further, an 11T signal was recorded once thereon, and then the extinction ratio of the amplitude of the 3T signal, i.e. the erase ratio, was measured with a spectrum analyzer.

In this case, a single rectangular pulse with a pulse width of 25.8 nm (at the power level P1) was used to record the 3T signal. In the case of recording the 11T signal, a pulse train (at the power level P1) including nine pulses was used. This pulse train includes the first pulse with a width of 25.8 ns and the second to ninth pulses with a width of 8.6 ns and portions (at the power level P3) between the respective pulses with a width of 8.6 ns. Portions where no mark was to be recorded were irradiated with continuous light at the power level P2. In this case, P3=P2. The power levels were determined as follows. The recording power level P1 was 1.5 times the lower limit of the power with a C/N ratio exceeding 45 dB. The power level P2 is the median in the power range in which the erase ratio exceeds 20 dB. Further, the reproduction power level P5 was set to be 1.0 mW.

With respect to the optical recording media subjected to the measurements under the above-mentioned conditions, an accelerated test was carried out, in which the optical recording media were maintained in a thermostatic oven at 90° C. with a relative humidity (RH) of 80% for 100 hours in a state where the 3T signal was recorded. After the accelerated test, the track subjected to the recording before the accelerated test was reproduced and then the C/N ratio was measured. Furthermore, an 11T signal was recorded once thereon and then the erase ratio was measured.

The results of the C/N ratios and erase ratios thus measured before and after the accelerated test are shown in Table 1.

TABLE 1

| Sample No. | Crystalline Nucleation Layer | | Before Accelerated Test | | After Accelerated Test | |
|---|---|---|---|---|---|---|
| | Lower Side [nm] | Upper Side [nm] | C/N Ratio [dB] | Erase Ratio [dB] | C/N Ratio [dB] | Erase Ratio [dB] |
| 1 | — | — | 53.0 | 30 | 52.8 | 22 |
| 2 | 0.2 | — | 52.3 | 32 | 52.1 | 28 |
| 3 | 0.5 | — | 51.4 | 31 | 51.6 | 30 |
| 4 | 1.0 | — | 51.4 | 34 | 51.3 | 33 |
| 5 | 1.5 | — | 51.0 | 35 | 50.7 | 33 |
| 6 | 2.0 | — | 50.3 | 35 | 50.3 | 34 |
| 7 | 2.5 | — | 49.0 | 32 | 49.4 | 33 |
| 8 | 3.0 | — | 46.3 | 30 | 46.9 | 33 |
| 9 | — | 1.0 | 51.6 | 33 | 51.8 | 33 |
| 10 | 0.5 | 0.5 | 51.1 | 36 | 50.8 | 35 |

In Table 1, the "Lower Side" in the left column of the crystalline nucleation layer indicates that the crystalline nucleation layer was formed between the phase change layer and the lower interface layer. The "Upper Side" dicates that the crystalline nucleation layer is formed between the phase change layer and the upper interface layer.

The sample 1 is an optical recording medium in which no crystalline nucleation layer was formed. The samples 2 to 8 are optical recording media in which the crystalline nucleation layer was formed only on the lower upper side of the phase change layer. The sample 9 is an optical recording medium in which the crystalline nucleation layer was formed only on the upper side of the phase change layer. Further, the sample 10 is an optical recording medium in which the crystalline nucleation layers were formed on both sides of the phase change layer.

The sample 1 with no crystalline nucleation layer has a high C/N ratio and a sufficient erase ratio before the accelerated test. However, after the accelerated test, the erase ratio was decreased by 8dB. Conceivably, this is because the crystalline nucleation ability of the phase change layer is deteriorated due to being maintained under the conditions of high temperature and high humidity. On the other hand, the samples provided with the crystalline nucleation layers had high erase ratios both before and after the accelerated test. Particularly, the samples with thick crystalline nucleation layers had high erase ratios. It is conceivable that this is because the material Sn—Te of the crystalline nucleation layer has an effect of improving the crystalline nucleation ability of the phase change layer and the effect is maintained even after the accelerated test. On the other hand, the C/N ratio before the accelerated test was decreased with the increase in thickness of the crystalline nucleation layer.

When the crystalline nucleation layer is thicker than a certain thickness as in the sample 8, the phase change layer was in a crystalline state right after the deposition. In the sample 8, the C/N ratio was low, namely about 30 dB, at the time of initial recording. In addition, the C/N ratio of the sample 8 increased as the recording was repeated, and reached about 50 dB to be saturated after the recording was repeated for about 20 times. From this, it was found that the optical recording medium according to Example 1 was not practical when having a crystalline nucleation layer with a thickness of 3.0 nm or more.

From the above-mentioned results, among the optical recording media according to Example 1, highly practicable and reliable optical recording media with sufficient C/N ratios and erase ratios both before and after the accelerated test were those provided with the crystalline nucleation layers with suitable thicknesses. In the optical recording media of the present example, a preferred thickness of the crystalline nucleation layer was in a range between 0.5 nm and 2.0 nm. However, the preferred thickness of the crystalline nucleation layer varies depending on the deposition conditions such as a sputtering power, a sputtered gas pressure, a substrate temperature, or the like, and the material and configuration of the layers. For example, according to experiments conducted by the inventors, it was possible to make the phase change layer deposited in an amorphous state exhibit its effect as long as the crystalline nucleation layer had a thickness in a range between 0.3 nm and 5 nm.

The samples 9 and 10 both had substantially the same C/N ratios and erase ratios as those in the sample 4. From this result, it was understood that the same effect was obtained both in the optical recording media provided with a crystalline nucleation layer on one side of the phase change layer and in the optical recording medium provided with the crystalline nucleation layers on both sides of the phase change layer.

Example 2

In Example 2, the description is directed to one example of manufacturing an optical recording medium with a crystalline nucleation layer containing nitrogen. In Example 2, the same optical recording medium as that of the sample 4 in Table 1 was produced except that nitrogen mixed in the crystalline nucleation layer during the formation of the crystalline nucleation layer.

The nitrogen was mixed in the crystalline nucleation layer by being mixed in a sputtered gas used when the crystalline nucleation layer was formed. In this manner, a plurality of samples were produced with various nitrogen partial pressures. The crystalline nucleation layer was deposited using a DC power supply under conditions of a sputtering power of 100 W and a sputtered gas pressure of 0.3 Pa. As the sputtered gas, a mixed gas of argon and nitrogen was used.

The total flow rate of the sputtered gas was set to be constant and the nitrogen partial pressure (the amount of the nitrogen gas in the sputtered gas) was varied through changing of the ratio between argon and nitrogen.

With respect to the plurality of samples thus produced, the same measurements as those in Example 1 were carried out. The measurement results are shown in Table 2.

TABLE 2

| Sample No. | Nitrogen Amount in Sputtered Gas [vol %] | Optical Constants | | Before Accelerated Test | | After Accelerated Test | |
|---|---|---|---|---|---|---|---|
| | | N | K | C/N Ratio [dB] | Erase Ratio [dB] | C/N Ratio [dB] | Erase Ratio [dB] |
| 4  | 0   | 4.5 | 5.2 | 51.4 | 34 | 51.3 | 33 |
| 11 | 10  | 4.5 | 2.6 | 51.8 | 33 | 51.7 | 32 |
| 12 | 20  | 4.2 | 1.7 | 52.1 | 33 | 52.2 | 31 |
| 13 | 40  | 3.8 | 1.3 | 52.6 | 32 | 52.5 | 31 |
| 14 | 60  | 3.5 | 1.0 | 52.8 | 33 | 52.8 | 32 |
| 15 | 80  | 3.3 | 0.8 | 52.7 | 32 | 52.8 | 31 |
| 16 | 100 | 2.9 | 0.6 | 52.9 | 32 | 52.9 | 30 |

Table 2 also includes optical constants of the crystalline nucleation layers, i.e. refractive indexes n and extinction coefficients k. The optical constants were calculated from the reflectance and transmittance of the crystalline nucleation layers. The measurements of the reflectance and transmittance were conducted with respect to crystalline nucleation layers (with thicknesses of about 10 nm) formed on quartz substrates under the same conditions as those used for the crystalline nucleation layers of the samples 4 and 11 to 16.

As is apparent from Table 2, the C/N ratio increases with the increase in the nitrogen partial pressure and exceeded 52 dB when the nitrogen amount in the sputtered gas was at least 20 vol %. On the other hand, the erase ratios were decreased with the increase in the nitrogen partial pressure, but sufficient values of at least 30 dB were kept. In Example 1, in order to obtain a C/N ratio of at least 52 dB, the thickness of the crystalline nucleation layer must be reduced to about 0.5 nm, resulting in the erase ratio below 30 dB after the accelerated test. On the other hand, both a C/N ratio of at least 52 dB and an erase ratio of at least 30 dB were obtained simultaneously by allowing the crystalline nucleation layer to contain nitrogen.

Preferably, therefore, the crystalline nucleation layer is deposited under a condition of a suitably high nitrogen partial pressure. Specifically, it is preferable that the nitrogen amount in the sputtered gas is in a range between 20 vol % and 100 vol %. Among others, a preferable range is between 40 vol % and 80 vol %. When the nitrogen amount in the sputtered gas is set to be in the range between 40 vol % and 80 vol %, respective characteristics of the optical recording medium can be well balanced. In this case, conceivably, the preferable range of the nitrogen partial pressure may vary depending on the type of the sputtering power supply, the sputtering power, the sputtered gas pressure, or the like. Particularly, when a RF power supply is used, the nitrogen tends to be taken into films easily. Therefore, it is expected that the suitable range of the nitrogen partial pressure may be about 20% to 30% of that in the case of using the DC power supply. Therefore, conceivably, when the optical constants, particularly, the extinction coefficient k, are used as an indicator, the range of the nitrogen partial pressure that gives desired film qualities can be specified under any sputtering conditions. From the results shown in Table 2, the range of the preferable extinction coefficient k is considered as being in the range between 0.6 and 1.7. In addition, according to the experiments conducted by the present inventors, the preferable range of the extinction coefficient k was between 0.5 and 2.0.

In the above, the results were obtained using a laser beam with a wavelength of 660 nm in a red wavelength region, which however does not limit the conditions applicable to the present invention. For instance, conceivably, even in the case of using a laser beam with a wavelength between 380 and 450 nm in an ultraviolet—blue wavelength region, the same effect of the crystalline nucleation layer can be exhibited.

As described above, according to the optical recording media of the present invention, an optical recording medium having stable recording and reproducing characteristics even after a long term storage can be obtained.

Furthermore, according to the method of manufacturing an optical recording medium according to the present invention, the optical recording media according to the present invention can be manufactured easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical recording medium, comprising a substrate and a recording layer positioned above the substrate, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer;

the phase change layer is obtained by being deposited in an amorphous state and then crystallized, the crystalline nucleation layer contains Te in a range between 33 atom % and 67 atom % and contains at least one selected from the group consisting of Sn—Te and Pb—Te.

2. The optical recording medium according to claim 1, wherein the phase change layer contains Ge, Sb, and Te as constituent elements, and the atomic ratio among Ge, Sb, and Te in the phase change layer are expressed as Ge:Sb:Te= X:Y:Z, where X+Y+Z=100, $10 \leq X \leq 45$, $5 \leq Y \leq 40$, and $40 \leq Z \leq 60$.

3. An optical recording medium, comprising a substrate and a recording layer positioned above the substrate, further comprising first and second information layers positioned on or above the subsubstrate and a separating layer positioned between the first and second information layers, at least one layer selected from the group consisting of the first and second information layers includes the recording layer, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer, the phase change layer is obtained by being deposited in an amorphous state and then crystallized, and the crystalline nucleation layer contains Te in a range between 33 atom % and 67 atom %.

4. An optical recording medium, comprising a substrate and a recording layer positioned above the substrate, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer, the phase change layer is obtained by being deposited in an amorphous state and then crystallized, the crystalline nucleation layer contains Te in a range between 33 atom % and 67 atom %, and the crystalline nucleation layer contains at least one element selected from the group consisting of oxygen and nitrogen.

5. An optical recording medium, comprising a substrate and a recording layer positioned above the substrate, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer, the phase change layer is obtained by being deposited in an amorphous state and then crystallized, the crystalline nucleation layer contains Te in a range between 33 atom % and 67 atom %, and the crystalline nucleation layer has an extinction coefficient in a range between 0.5 and 2.0.

6. An optical recording medium, comprising a substrate and a recording layer positioned above the substrate, wherein the recording layer includes a phase change layer changing in phase reversibly between a crystalline state and an amorphous state by an irradiation of an optical beam and a crystalline nucleation layer positioned adjacent to the phase change layer for facilitating crystallization of the phase change layer, the phase change layer is obtained by being deposited in an amorphous state and then crystallized, the crystalline nucleation layer contains Te in a range between 33 atom % and 67 atom %, and the phase change layer has an average thickness between 4 nm and 14 nm.

7. A method of manufacturing an optical recording medium provided with a recording layer including a phase change layer and a crystalline nucleation layer positioned adjacent to the phase change layer, comprising:

(a) depositing the phase change layer to be in an amorphous state;

(b) forming the crystalline nucleation layer before or after the process (a); and (c) crystallizing the phase change layer by an irradiation of an optical beam on the phase change layer in the amorphous state after the processes (a) and (b), wherein the phase change layer changes in phase reversibly between an crystalline state and an amorphous state by an irradiation of an optical beam, the crystalline nucleation layer facilitates crystallization of the phase change layer and contains Te in a range between 33 atom % and 67 atom %, and the crystalline nucleation layer contains at least one selected from a group consisting of Sn—Te and Pb—Te.

8. The method of manufacturing an optical recording medium according to claim 7, wherein the phase change layer contains Ge, Sb, and Te as constituent elements, and the atomic ratio among Ge, Sb, and Te in the phase change layer are expressed as Ge:Sb:Te=X:Y:Z, where $X+Y+Z=100$, $10 \leq X \leq 45$, $5 \leq Y \leq 40$, and $40 \leq Z \leq 60$.

9. A method of manufacturing an optical recording medium provided with a recording layer including a phase change layer and a crystalline nucleation layer positioned adjacent to the phase change layer, comprising:

(a) depositing the phase change layer to be in an amorphous state;

(b) forming the crystalline nucleation layer before or after the process (a); and (c) crystallizing the phase change layer by an irradiation of an optical beam on the phase change layer in the amorphous state after the processes (a) and (b), wherein the phase change layer changes in phase reversibly between an crystalline state and an amorphous state by an irradiation of an optical beam, the crystalline nucleation layer facilitates crystallization of the phase change layer and contains Te in a range between 33 atom % and 67 atom %, wherein the process (b) comprises forming the crystalline nucleation layer in an atmosphere containing at least one element selected from a group consisting of oxygen and nitrogen, and the process (c) comprises allowing the element selected from the group consisting of oxygen and nitrogen to leave from the crystalline nucleation layer.

\* \* \* \* \*